July 29, 1941.    H. BUSCH    2,251,238

PNEUMATIC CARRIER

Filed March 20, 1939

Inventor

Herman Busch

By Jas E Britt

Attorney

Patented July 29, 1941

2,251,238

UNITED STATES PATENT OFFICE 2,251,238

PNEUMATIC CARRIER

Herman Busch, Long Island City, N. Y., assignor to Airmatic Systems, Inc., a corporation of New York Application March 20, 1939, Serial No. 262,802

6 Claims. (Cl. 243—34)

This invention relates to carriers or the like employing telescoping double walled shells, the most common embodiment of which is the so called cash carriers which employ two shells open at one end and closed at the other and carrying a felt head or bumper secured to the closed end. The shells are provided with windows at one side which when the shells are telescoped together may be brought into registry by rotating the shells with respect to each other for access to the interior of the carrier and which when the carriers are rotated in the reverse direction act to close the carrier.

These carriers are formed with the closed end of the shells as a flat transverse terminus to which the bumper head is secured by bolts or screws passing through holes in the transverse end. These bumper head form the wear members of the carrier and are therefore periodically removed and replaced. In order to most readily facilitate the removal of the heads it is desired that the carrier shells be separated so that the interior of the shell may be accessible from the open end of the shell for removal of the head. In addition to this the shells may become dented or otherwise bruised while in use causing the two shells to bind against relative rotation. In this condition the carriers are practically useless without repair. For repair of this kind it is quite necessary that the shells be separated so they may be mounted on mandrels and smoothed out again.

The customary method of construction is, when the carriers are assembled, to mount a rivet in the outer shell in position to rest in the window of the inner shell and to engage the transverse edge of the inner shell window to hold the shells against separation and at the same time permit relative rotation of the same.

It is an object of this invention to provide an element to displace the rivet ordinarily used which will permit the shells to be separated without removal of the element.

A further object of this invention is to produce such an element in a form which may be applied to carriers in which the rivet has heretofore been employed.

A further object is to arrange the device so that it may be moved out of its position against the transverse edge of the carrier shell window to permit the shells to be separated and reposition itself when the shells are reassembled.

Still another object is to provide the element of such a substantial nature as to fully perform all of the functions heretofore performed by the rivet.

These and other objects will be apparent from the following description and claims taken together with the drawing in which:

Figure 1:
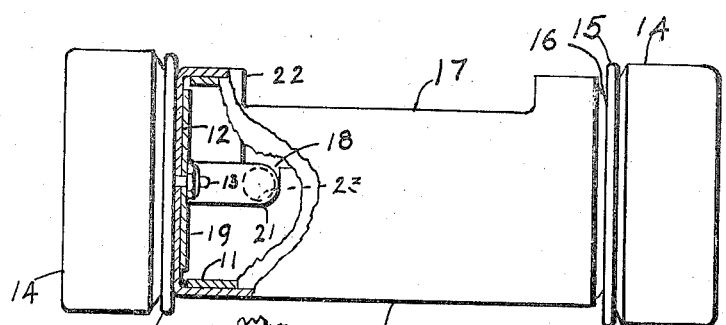
Fig. 1 is a view partly in section with the carrier in position to show the edge of the spring arm.

Referring now to the drawing, the carrier shown embodying the invention is a typical cash carrier comprising an outer shell 10 and an inner shell 11 telescoped into the outer shell. The shell 10 is open at the right end and provided with a head section 12 at the left end. By means of suitable bolts or screws 13 the usual felt head 14 and washer 15 are secured to the head 12. The shell 11 is provided with an open end at the left and a head end 16 at the right to which are secured similar members 14 and 15. Each of these shells is provided with a window 17 in its side which may be brought into registry with the window of the other for providing access to the shell and which may be rotated to a position out of registry to close the shell, all of which construction is well known in the art.

In the prior art the shells were telescoped into position and a rivet set in the outer shell at a position near one lateral edge of the window and arranged so that its head was in position to engage the transverse margin of the window of the inner shell to hold the carrier together against separation. When a carrier was opened and closed, the rivet would move along this transverse margin from one corner of the window to the other and seat in a slot 18 in the corner of the window so as to provide a stop member to check the relative rotation of the shells when they reached open or closed position as the case might be.

According to the present invention a device has been constructed which will serve all the functions of the rivet, both including holding the shells against longitudinal separation and acting as a stop member to limit the relative rotation of the shells and yet permit easy separation of the same and which further may be readily attached to carriers already in use.

This device in its preferred form comprises a flat base plate 19 carrying an arm 21 bent backwardly from the base to extend longitudinally along the inner surface of the inner shell 11 and past the transverse margin 22 of the window. The outer end of the arm is provided with a detent 23 normally held by the arm in the window opening in position to engage the margin 22 for holding the shell against separation and to engage the slots 18 to provide stops for limiting the relative rotation of the shells. The detent may be in the form of a button as shown in Figs. 2 and 3 or it may take some other form such as that shown in Fig. 4 in which the detent is struck up from the outer end of the arm and presents a sloping face.

Figure 3:
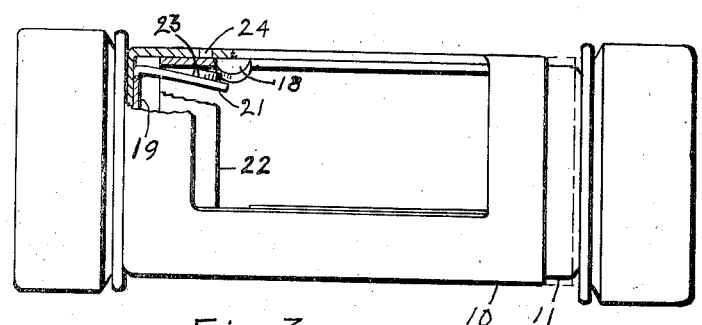
Fig. 3 is a view partly in section showing the spring arm detent disengaged and the inner shell partly withdrawn; and, Fig. 4 is a projected view of a modified form of spring arm and base plate.

The base plate 19 and arm 21 may be stamped from steel sheets or other spring material tempered to provide sufficient resiliency for the arm to be sprung backwardly sufficiently to disengage the detent 23 from the margin 22, as shown in Fig. 3, when it is desired to separate the shells and spring back in position when the shells are reassembled.

When formed as just described of flat spring material, the arm has diametrical resiliency and at the same time the circumferential rigidity desired for enabling the detent to serve as a stop member to limit the relative rotation of the shells in opening and closing the carrier. The most common form of the carrier above referred to and shown in the drawing has its bumper head 14 secured to the shell by means of removal screws or bolts 13. The plate 19 according to this invention is punched with holes spaced apart to receive the bolts 13. For a given type of carrier the holes in the head of the shell will be in the same position with respect to the shell window and by this means the holes in the plate 19 can be positioned so as to place the arm 21 and detent 23 in definite fixed relation to the window of the outer shell.

Figure 2:
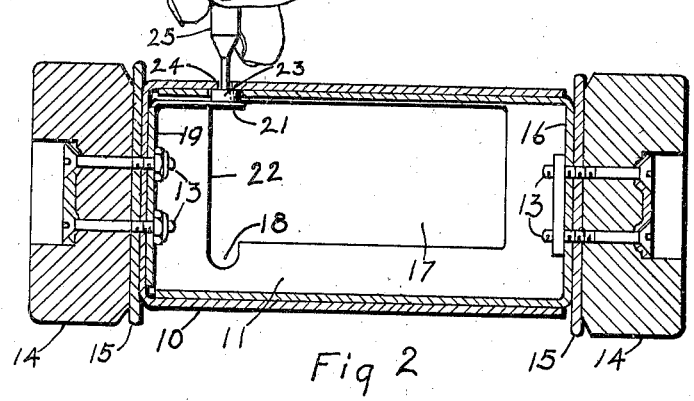
Fig. 2 is a view in full section with the carrier in position to show the edge of the spring arm.

In order to facilitate the moving back of the detent, the spring arm 21 and the detent are positioned so that a portion of the latter falls underneath the hole within which the rivet hereinbefore referred to is normally set and shown as opening 24 in Fig. 2. With this arrangement when it is desired to separate the carrier shells, a stylus 25 or some pointed instrument may be inserted through the opening 24 to bend the arm 21 backwardly until the detent 23 is sufficiently removed to permit the inner shell to be moved outwardly as shown in Fig. 3. As the shell begins to move outwardly, the marginal edge of the window will come against the stylus. In this position, however, the detent is now over the marginal edge of the window so the stylus may be removed and permit complete separation of the shells.

Figure 4:
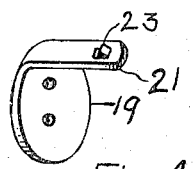

When it is desired to reassemble the shells, the inner shell may be telescoped into the outer until it engages the detent 23. If the detent is formed with a sloping surface, as shown in Fig. 4, it will slide over the edge of the inner shell in ratchet fashion and snap into the window opening at the end of the full telescoping movement.

It will be noted that, as just described, with the arrangement according to this invention, the arm 21 and detent 23 provide for easy separation and reasssembling of the carriers and yet at the same time provide a detent which serves as a retaining and stop member quite as effectively as the rivet heretofore employed. It is further to be noted that these characteristics are provided in a member which may be secured to the carrier shell without employing any other parts not normally a part of the carrier of the prior art.

A further characteristic of the present invention is that the detent carrying arm is placed interiorly of the carrier in a protected position and is so formed as to not interfere with the insertion of the normal materials transported.

Further, this invention makes it possible to provide a quick separating type of telescoped shell carrier with the minimum amount of obstructing elements within the carrier shell and in an extremely simple form of design for new carriers and which may be applied to old carriers with substantially no change in its form.

While I have shown my invention in but two forms it will be apparent to those skilled in the art that it may be embodied in many other forms and modifications without departing from the spirit thereof and it is desired that it shall be limited only by the prior art and the appended claims.

I claim:

1. In a carrier comprising an outer shell having an open end and a closed end and an inner shell telescoped into the outer shell, an opening in the side of the inner shell, a spring secured internally against the head of the outer shell and having a portion extending inward from said head longitudinally of the shells past said opening in the inner shell, said spring carrying a portion normally fitting in said opening to hold the shells against separation and arranged to flex transversely of the shell out of said opening for permitting shell separation.

2. In a carrier, inner and outer shells one arranged to telescope within the other, each of said shells having one end open and the other end closed forming a head, said shells being provided with window openings in their sides which may be moved into registry for opening the carrier and moved out of registry to close the same, the end of the window of the inner shell nearest its open end forming a transverse margin and having slots formed at its corners to extend said margin under the lateral edges of the window of the outer shell when the windows of both shells are in registry, and detent means disposed internally of the carrier for holding the shells in telescoped relation, said detent means comprising a plate detachably secured internally against the inner side of the head of the outer shell and a spring member extending from said plate longitudinally of the shell past the position of the transverse margin of the inner shell, said spring being disposed adjacent the longitudinal edge of the window of the outer shell entirely underneath said edge, a detent carried by the spring in position to engage said transverse margin and disposed to rest in one of said slots when the carrier is open and in the other when the carrier is closed, said spring being yieldable for disengaging the detent from the margin when the shells are to be separated.

3. In a carrier, inner and outer shells one arranged to telescope within the other, each of said shells having one end open and the other end closed forming a head, said shells being provided with window openings in their sides which may be moved into registry for opening the carrier and moved out of registry to close the same, the end of the window of the inner shell nearest its open end forming a transverse margin and having slots formed at its corners to extend said margin under the lateral edges of the window of the outer shell when the windows of both shells are in registry, said outer shell having a hole provided near one corner of its window along its longitudinal edge in a position over the position of one of said slots at a window corner of the inner shell, and detachably mounted spring means disposed wholly within the carrier for normally holding the shells against separation but yieldable to permit separation, said spring means comprising a base detachably secured to the head of the outer shell, and a yieldable arm extending longitudinally within the carrier under the body portion of the outer shell to a point underneath said hole in the window corner of the outer shell, a detent carried by said arm for engaging the transverse margin and disposed to rest in one of said slots when the carrier is open and in the other when the carrier is closed, said arm being accessible to an instrument inserted through said hole for flexing the arm to disengage the detent from said margin when the shells are to be separated.

4. In a carrier inner and outer shells, one arranged to telescope within the other, said inner shell having an edge formed to extend transversely thereof and engageable from the interior of the carrier, means secured to the internal end of the outer shell embodying a retaining element formed as a spring and arranged to extend over said edge, said element being provided with a detent for engaging said transverse edge and which may be disengaged by flexing said spring when the shells are to be separated, said outer and inner shells being provided with openings which may be brought into registry over said retaining element whereby an instrument may be inserted to move the detent out of engagement with said transverse edge for separating said shells.

5. In a carrier comprising telescoping inner and outer shells, rotatable within each other with the respective shells closed at one end and disposed to form heads at opposite ends of the carrier to which bumpers are held by securing means, corresponding openings in the side of each shell disposed to be brought into registry by relative rotation of the shells for opening the carrier, and by other relative rotation brought out of registry for closing the carrier, the opening of the inner shell nearest the closed end of the outer shell having a margin forming an abutment in a radial plane with respect to the axis of the shells, a detent held normally fixed relative to the outer shell and arranged to normally engage said abutment as the shells are rotated for holding said shells against axial separation, said detent being carried by a transversely yieldable spring within the protecting cavity of said carrier and extending longitudinally along the interior of the inner shell from a base secured against the interior head of the outer shell, said detent, spring and base being formed as a separate unit from any of the remaining shell structures, said base formed to embody openings by means of which the base may be secured in position by said bumper securing means.

6. In a carrier comprising an outer shell having an open end and a closed end and a corresponding inner shell telescoped into the outer shell, a portion of the inner shell being recessed to form a transverse abutment and means detachably secured against the inner end of the outer shell and carrying a spring member extending longitudinally of the interior of the shell from said means in the direction of said recess, said spring member having a detent with one edge normally engaging said abutment for holding the shells against separation but disengageable from said abutment by flexing said spring for permitting the shells to be separated, said detent having a face sloping downwardly from its engaging edge whereby the detent is caused to ride over the edge of the open end of the inner shell and drop into said recess against said abutment as the shell is retelescoped into assembled position.

HERMAN BUSCH.